United States Patent [19]

Muddiman

[11] Patent Number: 4,809,729
[45] Date of Patent: Mar. 7, 1989

[54] PRESSURE-RELIEF DEVICE

[75] Inventor: George S. Muddiman, Oakville, Canada

[73] Assignee: Process Equipment Limited, Oakville, Canada

[21] Appl. No.: 146,486

[22] Filed: Jan. 21, 1988

[51] Int. Cl.$^4$ .............................................. F16K 17/40
[52] U.S. Cl. .................................. 137/68.1; 220/89 A
[58] Field of Search ...................... 137/68.1; 220/89 A

[56] References Cited

U.S. PATENT DOCUMENTS

| | | | |
|---|---|---|---|
| 2,954,897 | 10/1960 | Hansen | 220/89 A |
| 3,091,359 | 5/1963 | Wood | 220/89 A |
| 3,698,598 | 10/1972 | Wood et al. | 137/68.1 X |
| 3,881,629 | 5/1975 | Shaw et al. | 137/68.1 X |

Primary Examiner—John Rivell
Attorney, Agent, or Firm—McFadden, Fincham, Marcus & Allen

[57] ABSTRACT

An improvement is provided in a safety pressure relief device adapted to be installed between a standard base flange and a standard hold-down flange including a first crowned rupture member, a second crowned rupture member, a resilient sealing membrane, the resilient sealing membrane being positioned between the first crowned member and the second crowned member, the first crowned member being positioned with respect to the second crowned member with its convex side away from the second crowned member, the convex side of the second crowned member being away from the first crowned member, both the first and second crowned members being perforate to allow pressure fluids to pass therethrough to be exerted against the sealing member, and means securing the first crowned rupture member and the second crowned rupture member to the resilient sealing member. The improvement comprises (a) the resilient sealing membrane forming a plane of symmetry between the first and second crowned rupture members; (b) each of the first and second crowned rupture members being provided with a flat outer lip; (c) an upper and a lower upstanding collar, each collar terminating in an outer lateral flat flange portion; and (d) the outer lateral flat flange portions of the collars, the flat outer lips of the crowned rupture members and the outer periphery of the resilient sealing membrane being permanently fastened together. In this way, the relief valve assembly is capable of being installed in either direction between the base flange and the hold-down flange.

4 Claims, 1 Drawing Sheet

PRESSURE-RELIEF DEVICE

This invention provides a pressure relief valve assembly. More particularly, the relief valve assembly of this invention is one which is adapted for installation in either direction.

The prior art discloses many forms of rupture discs or relief valves, some of which are used for specific purposes or applications and consequently, have certain structural configurations suitable for such applications.

Typical of the prior art patents in this field are the following: U.S. Pat. Nos. 3,464,351; 3,344,032; 3,484,817; 3,834,580; 3,722,734; 3,294,277 and 4,231,484.

A further prior art valve is disclosed in U.S. Pat. No. 3,091,359. This reference teaches a disc assembly having two rupture discs arranged in opposed relationship for relieving pressure in either direction. As shown in this patent, the flanges of the respective rupture discs are in juxtaposition and displaced from the plane of the diaphragm so that the flanges extend upwardly and outwardly. Pipe flanges having an appropriate configuration, mating with the configuration of the disc flanges, are provided.

U.S. Pat. No. 3,698,598 discloses a rupture disc for relieving pressure in one direction only, and includes a positioning member on one side thereof for positioning the device centrally between flanges upon its installation.

U.S. Pat. No. 4,046,280 shows a rupture disc for pressure relief in one direction which has puncturing means mounted in a centering ring, and which includes a second centering ring on the opposed side of the disc.

U.S. Pat. No. 3,815,779 teaches a rupture disc which is supported between a pair of annular supporting members. One of the supporting members is provided with a spacing member surrounding the periphery thereof. The spacing member provides for the centering of the disc device between pipe flanges.

U.S. Pat. No. 3,881,629 provides a one-way relief device which has a mounting ring with a centering sleeve for the positioning of the device in use between pipe flanges.

Canadian Pat. No. 638,422 discloses a rupture disc assembly for one-way pressure relief which includes a positioning member to aid in positioning of the device in use.

Canadian Pat. No. 1,046,891 provides a complex rupture disc assembly having two rupture discs and two guide sleeves, each disc and sleeve being provided as a separate entity, for pressure relief in one direction. The device of this reference also includes a spacer ring as well as knife means.

Thus, from the prior art, although two discs have been proposed in a single structure, there has not been, heretofore, a structure shown in which two discs have been combined for relief of pressure in either direction, in combination with means to permit installation of the device in either direction, without having to provide additional components or modified flanges etc.

Again, while the prior art discloses means for positioning the relief device, mounted on either side of the device for placement between two opposed flanges, such arrangements do not-show the use of two rupture discs and thus, the provision of two positioning means becomes immaterial for the purposes of this invention, since the positioning of such a prior art device, having two positioning members, without a second disc would not serve to fulfill the objectives of the present invention.

One of the features of the rupture disc assembly the present invention is that it provides a true and infallible method for installation in the field by unskilled workers. This distinct advantage over the prior art devices is due to the fact that the device of this invention is capable of being installed in either direction and it will carry out its relief function regardless of the direction in which it is installed. As such, the disc assembly of the present invention provides pressure relief in either direction, in a single structure, while also providing means enabling the foolproof installation of the device.

In accordance with one embodiment of this invention, an improvement is provided in a safety pressure relief device adapted to be installed between a base flange and a hold-down flange including a first crowned rupture member, a second crowned rupture member, a resilient sealing membrane, the resilient sealing membrane being positioned between the first crowned member and the second crowned member, the first crowned member being positioned with respect to the second crowned member with its convex side away from the second crowned member, the convex side of the second crowned member being away from the first crowned member, both the first and second crowned members being perforate to allow pressure fluids to pass therethrough to be exerted against the sealing member, and means securing the first crowned rupture member and the second crowned rupture member to the resilient sealing member, the improvement comprising:
  (a) the resilient sealing membrane forming a plane of symmetry between the first and second crowned rupture members;
  (b) each of the first and second crowned rupture members being provided with a flat outer lip;
  (c) an upper and a lower upstanding collar, each collar terminating in an outer lateral flat flange portion; and
  (d) the outer lateral flat flange portions of the collars, the flat outer lips of the crowned rupture members and the outer periphery of the resilient sealing membrane being permanently fastened together;
whereby the relief valve assembly is capable of being installed in either direction between a standard base flange and a standard hold-down flange.

In this improved safety pressure relief device, preferably the outer lateral flat flange portions of each of the upper and lower collar members extends generally perpendicular to its respective collar member and the dome-shaped central portion of the first and second crowned rupture members have a plurality of centrally located apertures having slits radiating outwardly to the outer peripheral edge of the dome and terminating in a further plurality of apertures.

The upstanding wall member of each of the upper and lower collar members are preferably secured in general alignment with each other; and the lateral flat flange portion of each of the upper and lower collar members are secured in opposed substantially parallel relationship to each other.

Preferably, the upstanding wall member of each of the upper and lower collar members is of a generally cylindrical configuration defining therebetween a chamber in which the dome-shaped central portion of the crowned rupture member is located, the upstanding wall member extending beyond the uppermost portion of the dome-shaped member to substantially enclose the same.

The resilient seal member used in the device of the present invention may be of any suitable flexible material known to those skilled in the art; particularly preferred in this respect is a seal member of TEFLON (the registered trade mark of DuPont for polytetrafluoroethylene).

In connection with the rupture members, it will be appreciated by those skilled in the art that the pressure at which the device is designed to rupture may be controlled by various parameters, including the arrangement and spacing of slits and apertures in the disc members, the size of the dome of the rupture members, the thickness thereof, etc. Such parameters are well known to those skilled in the art and need not be discussed in detail herein. In a preferred form, the first and second rupture members have identical configurations.

The collar members used in the apparatus of the present invention have, as outlined above, an upstanding wall member and a flange portion extending outwardly from the wall member.

Preferably the collar member is a one-piece structure of suitable material such as a metal, or depending on its intended usage, of a durable plastic material. For most purposes, the integral one-piece collar members will normally have the upstanding wall member and the flange portion at 90° to each other although for some installations, this may vary several degrees from a right angle. In its preferred form, the collar member comprises a one-piece metallic member of a generally circular configuration defining between the upstanding wall members a circular chamber in which the dome-shaped central portion of the rupture member is located; in the preferred configuration where both the first and second collar members are substantially identical, the upstanding wall member of the first of the collar members will be in general alignment with the upstanding wall member of the second collar member. In a like fashion, each flange member of the first and second collar member is thus adapted to lie in opposed parallel relationship with the other.

As will be appreciated, the collar members of the device of the present invention not only provide protection for the rupture members, but also aid in the installation of the assembly between pipe flanges. Thus, the upstanding wall members provide a means whereby the assembly can be installed properly, not only in either direction, but the device cannot be installed off-centre which would result in the assembly not functioning properly.

Typically, the height of the upstanding wall member will vary between one-quarter inch to e.g., one inch or more depending on the type of the rupture member adapted to fit within the enclosed circular portion of the upstanding wall member and similarly, the laterally extending flange member or portion will have a width varying from one-quarter inch to one inch or more depending on the type of unit in which the structure of the present invention is adapted to be mounted.

Having thus generally described the invention, reference will now be made to the accompanying drawings, illustrating preferred embodiments and in which.

Figure 1:
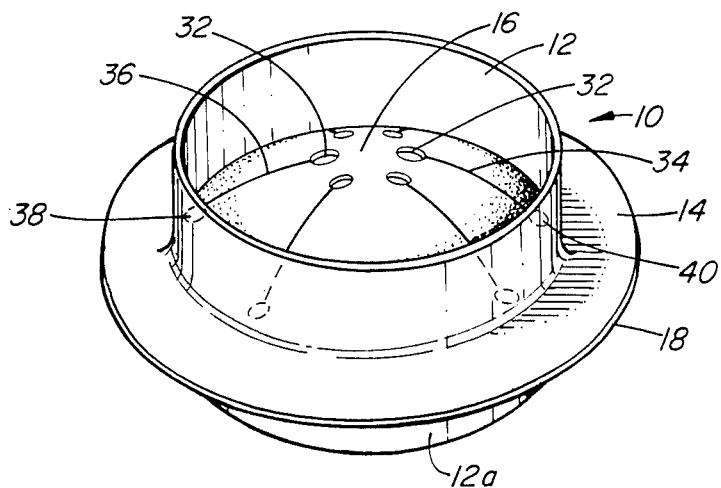
FIG. 1 is a perspective view of an apparatus according to the present invention.

The two-way relief valve assembly of the present invention is shown in FIG. 1 indicated generally by reference numeral 10. It will be appreciated that each side of the relief assembly is substantially identical and accordingly, the description pertaining to the top portion illustrated in FIG. 1 also relates to the bottom portion of the relief assembly.

The relief assembly of FIG. 1 comprises an upstanding collar 12 having walls of frusto-conical configuration projecting above the dome 16. Collar 12 has an outer surrounding periphery 14 extending laterally from the walls and forming a substantially flat flange portion 18.

Figure 2:
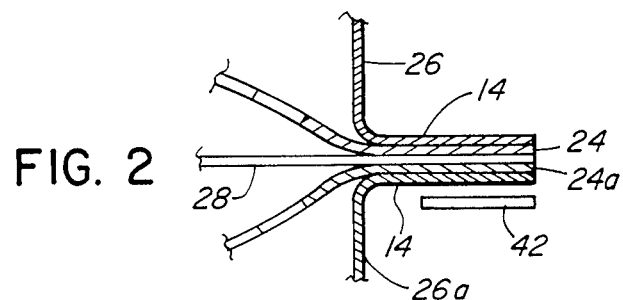
FIG. 2 is a vertical section taken along the side edge of the unit of FIG. 1 illustrating in detail the collar member.
Figure 3:
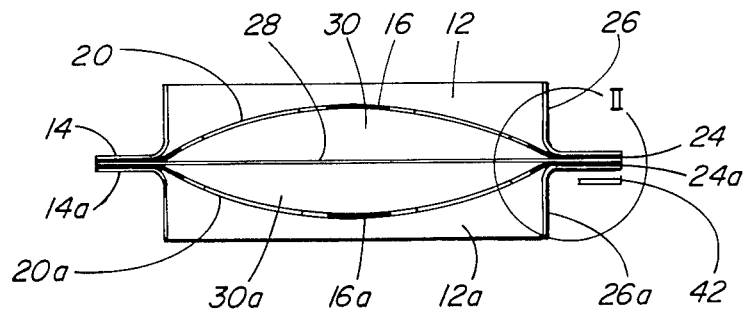
FIG. 3 is a vertical section taken to a centre line of the apparatus of FIG. 1.

The component parts of the relief device of the present invention can be seen in greater detail from FIGS. 2 and 3. As described above, and as will be seen from FIGS. 2 and 3 the top and bottom of the relief assembly are of substantially identical configuration. Thus, there is provided collars 12 and 12a and rupture discs 20 and 20a. Rupture discs 20 and 20a are positioned in diametrically opposed relationship to each other so that the concave sides of the discs are in facing relationship. Rupture discs 20 and 20a comprise a dome-shaped central portion 16 and 16a and flat outer lip members 24 and 24a encircling the dome-shaped central portion.

Collars 12 and 12a, as with the discs 20 and 20a, are also positioned in diametrically opposed relationship so that the upstanding frusto-conical walls 26 and 26a, project in opposite directions. The outer surrounding periphery 14 and 14a of collars 12 and 12a, as will be seen from FIG. 2, are in seating engagement with the lips 24 and 24a of discs 20, 20a. The peripheries 14 and 14a extend laterally at approximately 90° from the upstanding frusto-conical walls 26, 26a, while the walls 26, 26a project above (in the case of wall 26a, below), the dome-shaped portions 16, 16a of rupture discs 20, 20a.

As will be seen from the drawings, the walls 26 and 26a are in general vertical alignment with each other and extend beyond the dome portions 16 and 16a respectively. As will also be seen from FIGS. 2 and 3, the flanges or lips 24 and 24a are in opposed, substantially parallel relationship.

A sealing member 28 is positioned between the rupture members 20 and 20a, thereby forming chambers 30 and 30a with the concave sides of the rupture discs. Sealing member 28, formed of a resilient material, is circular in shape and extends in sealing engagement in between the lips 24 and 24a.

As shown in FIGS. 1 and 2, the rupture discs 20 and 20a are provided with central apertures such as those designated by reference numeral 32. Slits 34, 36, etc., radiate outwardly from the central apertures and terminate in outer apertures such as 38 and 40.

The component parts of the rupture disc assembly described above may be fastened together around the periphery 14 by any suitable means, e.g., by means of spot welds, adhesive, etc.

Upon installation of the assembly between conventional pipe flanges, suitable sealing gaskets may be provided to prevent any leakage around the edges of the device.

From the above description, it will be appreciated that a reversible rupture disc is provided so that incorrect installation of the device is completely eliminated. When the device is installed, and in operation to relieve pressure, any pressure exerted on the device from the underside would cause the seal or diaphragm 28 to move upwardly against the concave side of disc 20. When the pressure increases to the point where the disc is designed to rupture, the disc 20 will rupture between adjacent apertures permitting the seal 28 to also rupture, thus providing the appropriate pressure relief. If a significant flow is present, the remaining disc 20a will reverse itself and rupture too.

When pressure is exerted from the top side of the device, the device operates in the same manner, except that the disc 20a would rupture initially.

It will be understood that various modifications can be made to the above described embodiments without departing from the spirit and scope of the invention.

I claim:

1. In a safety pressure relief device adapted to be installed between a base flange and a hold-down flange including a first crowned rupture member, a second crowned rupture member, a resilient sealing membrane, said resilient sealing membrane being positioned between said first crowned member and said second crowned member, said first crowned member being positioned with respect to said second crowned member with its convex side away from said second crowned member, the convex side of said second crowned member being away from said first crowned member, both said first and second crowned members being perforate to allow pressure fluids to pass therethrough to be exerted against said sealing member, and means securing said first crowned rupture member and said second crowned rupture member to said resilient sealing member, the improvement comprising:

(a) said resilient sealing membrane forming a plane of symmetry between said first and second crowned rupture members;
   (b) each of said first and second crowned rupture members having a flat, planar annular lip and a dome-shaped central portion, said dome-shaped central portion extending directly out of the plane of said annular lip;
   (c) an upper and a lower upstanding collar, each collar terminating in an outer lateral flat flange portion; and
   (d) the outer lateral flat flange portions of said collars, the flat outer lips of said crowned rupture members and the outer periphery of said resilient sealing membrane being permanently fastened together;

whereby said relief valve assembly is capable of being installed in either direction between said base flange and said hold-down flange.

2. The improved safety relief device of claim 1, wherein said outer lateral flat flange portions of each of said upper and lower collar members extends generally perpendicular to its respective collar member and, each dome-shaped central portion having a plurality of centrally located apertures, said apertures having slits radiating outwardly to the outer peripheral edge of said dome-shaped central portion and terminating in a further plurality of apertures.

3. The improved safety pressure relief device of claim 1, wherein said upper and lower collar members are secured in general alignment with each other; and wherein said lateral flat flange portion of each of said upper and lower collar members are secured in opposed substantially parallel relationship to each other.

4. The improved safety pressure relief device of claim 2, wherein each of said upper and lower collar members is of a generally cylindrical configuration defining therebetween a chamber in which said dome-shaped central portion of said crowned rupture member is located, said upstanding wall member extending beyond the uppermost portion of the dome-shaped member to substantially enclose the same.

* * * * *